United States Patent
Zaccone et al.

(10) Patent No.: US 6,980,548 B1
(45) Date of Patent: Dec. 27, 2005

(54) INTERNET FORWARDING METHOD RELATED SYSTEM AND RELATED DEVICES

(75) Inventors: Carmelo Zaccone, Châtelet (BE);
Bernard Henry Daniel Sales, Brussels (BE); Yves T'Joens, Sint-Michiels-Brugge (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/348,575

(22) Filed: Jul. 7, 1999

(30) Foreign Application Priority Data

Jun. 24, 1999 (EP) .................................. 99401581

(51) Int. Cl.⁷ .......................... H04L 12/56; H04L 12/28
(52) U.S. Cl. ...................... 370/392; 370/389; 370/401
(58) Field of Search .................. 370/351, 355, 370/400–401, 409, 392, 463, 235, 395.5, 370/410, 432, 389–390, 465; 709/219

(56) References Cited

U.S. PATENT DOCUMENTS

| | | | |
|---|---|---|---|
| 5,751,971 A | 5/1998 | Dobbins et al. | 709/238 |
| 5,802,316 A | 9/1998 | Ito et al. | 709/241 |
| 6,118,768 A * | 9/2000 | Bhatia et al. | 370/254 |
| 6,389,475 B1 * | 5/2002 | Speakman et al. | 709/232 |
| 6,400,712 B1 * | 6/2002 | Phillips | 370/355 |
| 6,523,696 B1 * | 2/2003 | Saito et al. | 709/223 |

FOREIGN PATENT DOCUMENTS

EP      0 605 339 A2    7/1994

OTHER PUBLICATIONS

M. Sosa et al, "An OSPF-Based Routing Algorithm for SMDS Networks" Communication for Global Users, Including A Communications Theory Mini Conference, Orlando, Dec. 6-9, 1992, vol. 2, Dec. 6, 1992, pp. 1057-1061, XP000357715, Institute of Electrical and Electronics Engineers ISBN.

* cited by examiner

*Primary Examiner*—Chi Pham
*Assistant Examiner*—Ronald Abelson
(74) *Attorney, Agent, or Firm*—Sughrue Mion, PLLC

(57) ABSTRACT

A Internet forwarding method, related system and related devices to be used for forwarding internet packets from a host connected to an internet towards a destination host connected to a private internet network and vice versa, where an internet network and a private internet network are coupled through at least one edge router, and where the destination host is assigned a global Internet address, and wherein the forwarding of the internet packets from one of at least one edge router towards the destination host and vice versa, is based only on the global internet address.

20 Claims, 4 Drawing Sheets

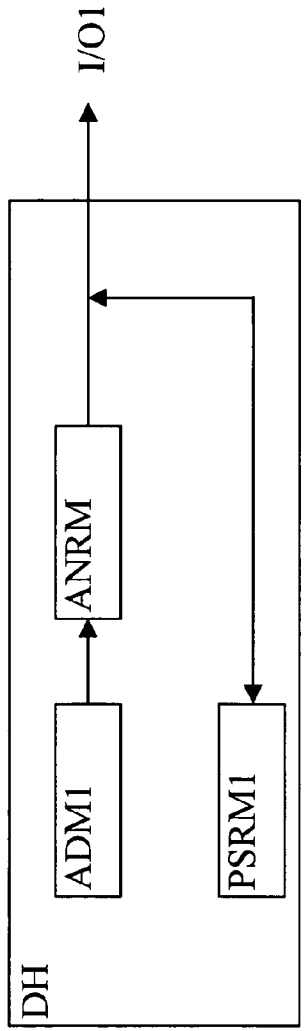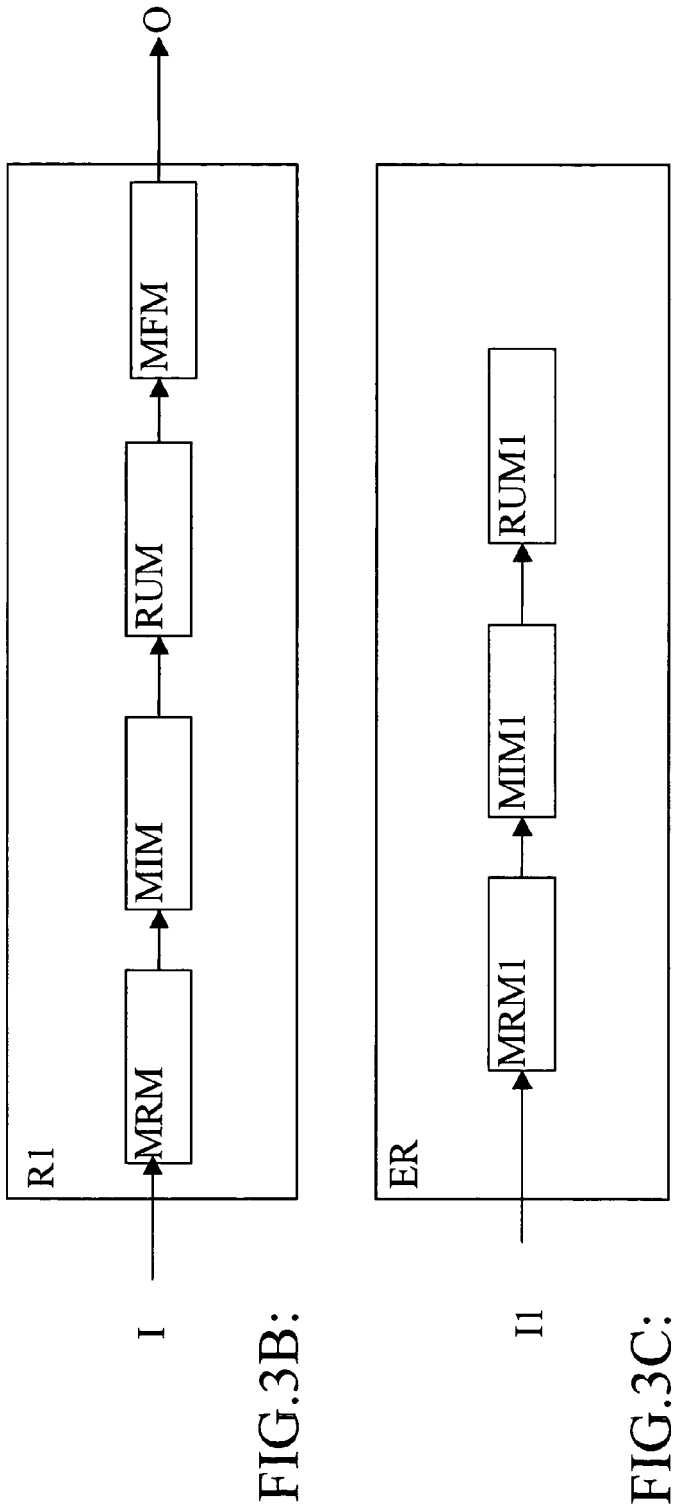
FIG.3A:
FIG.3B:
FIG.3C:

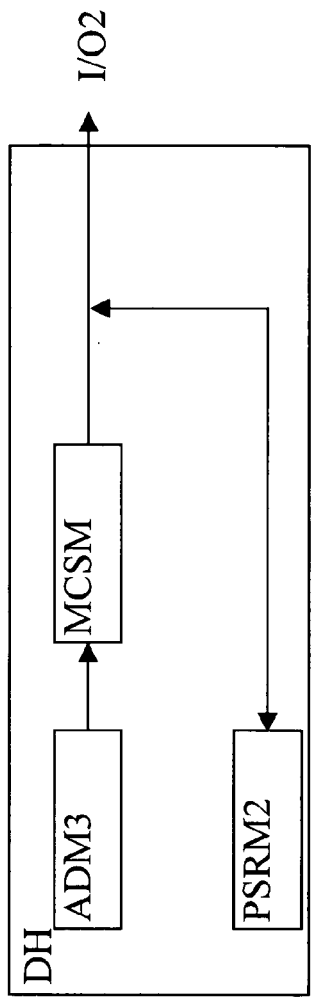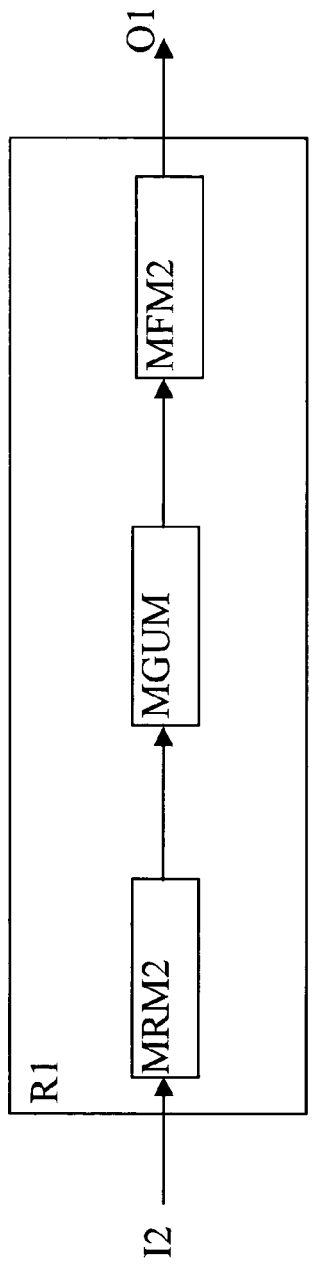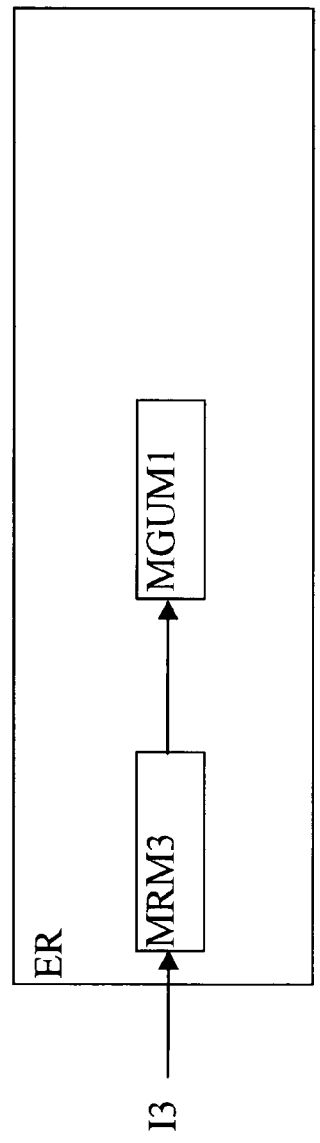
FIG.4A:  FIG.4B:  FIG.4C:

INTERNET FORWARDING METHOD RELATED SYSTEM AND RELATED DEVICES

BACKGROUND OF THE INVENTION

The present invention relates to an internet forwarding method, and the related system therefor.

Such a internet forwarding method is already known in the art, e.g. from section 5, p. 16 of Internet draft *"IP Network Address Translation (NAT) Terminology and Considerations"* from the authors P. Srisuresh and M. Holdrege. This IETF internet-draft is published in Apr. 1999 at the IETF internet-site under the title "draft-ietf-nat-terminology-02.txt". Therein, an internet forwarding system is described wherein a host in a private network needs internet connectivity because a host on the internet needs to contact the private host or the private host needs to contact an internet host. The context of the description is related to the internet access of a privately addressed network. In such a privately addressed network all hosts are, at boot time, assigned a private IP address to enable TCP communications inside the network. However, in order to offer Internet connectivity to a private host, a global IP address from a pool of IP-addresses, is assigned to this private host, when this internet connectivity is required.

Then the internal routing, within the privately addressed network, has to be managed in order to allow the establishment of a path through the privately addressed network to the private host with a globally assigned and legally registered IP-address. This in order to enable the communication between the privately addressed host and a host connected to the internet. To enable the communication a tunnel is established, connecting the edge router of the private network with the addressed private host. The establishment of a tunnel between the edge router of the private network and the addressed private host has the following disadvantages: the edge router is heavy loaded and needs to keep state information, which creates a single point of failure, subsequently resulting in a limited robustness of the tunnelling. No load balancing of the outgoing traffic is possible in case of use of tunnelling and additional header-overhead occurs because of encapsulation.

SUMMARY OF THE INVENTION

An object of the present invention is to provide an internet forwarding method of the above known type but wherein the transfer of packets from an edge router of the private network to the addressed private host is more efficient, the edge router load is decreased and the robustness is increased.

According to the invention, this object is achieved by the method and the corresponding related system. Indeed, by forwarding packets from an edge router of the private network to the globally addressed private host only based on the global internet address, and vice versa it is avoided that the internet packets have to be encapsulated, in this way reducing the overhead. Because it is possible to dynamically change the path along which the packets are routed, the single point of failure is avoided and in this way, the robustness has improved. This way of handling also solves the load-balancing problem of the prior art situation.

Another characteristic feature of the present invention concerns the implementation of the method using the Open shortest Path protocol, the corresponding system and the corresponding related device.

At the assignment of a global internet address to a private host, a router daemon is activated at this private host in order to facilitate this host to be contacted from the internet, or vice versa. The router daemon active at the private host will notify the entire private network about its presence using the Open Shortest Path First protocol, further referred to as OSPF. All routers of the private network add the assigned global internet address as an entry to their routing table. At the time all routers of the private network are updated and a packet with the global internet address arrives at the edge router (ER) of the private network, the packet is routed hop-by-hop towards the private host using the information provided by each of the routing tables. Because it is possible to dynamically change the path along which the packets are routed, by updating the routing-table of each of the routers, the single point of failure is avoided and in this way the robustness has improved. This way of handling also solves the load-balancing problem of the prior art situation.

A further characteristic feature of the present invention concern the implementation of the method using the Resource ReServation Protocol, further referred to RSVP, the corresponding system and the corresponding related device.

At the assignment of a global internet address to a private host, all routers on the shortest path towards the edge router of the private network and the edge router are notified about the assignment of the global IP-address of the destination host. All routers on the shortest path between the destination host and the edge router add the assigned global internet address as an entry to their routing table. At the time all routers of the private network are updated and a packet with the global internet address arrives at the edge router of the private network the packet is routed towards the private host along this shortest path based on the global IP-address within the data packet and the information of the respective routing tables. Because it is possible to dynamically change the path along which the packets are routed, by updating the routing-table of each router on the shortest path, the single point of failure is avoided and in this way, the robustness has improved. This way of handling also solves the load-balancing problem of the prior art situation.

Another characteristic feature of the present invention concerns the implementation of the method using a multicasting protocol, the corresponding system and the corresponding related devices.

At the assignment of a global internet address to a private host, the private host will subscribe to a multicasting-group whereof the edge router is the root or the subscriber administration, by sending a join-message towards the edge router along all routers on the shortest path towards this edge router. All routers on the shortest path will update their multicast group information in this way establishing link by link the multicast-tree consisting of one single branch between the edge router and the destination host. Because it is possible to dynamically change the path along which the packets are routed, the single point of failure is avoided and in this way, the robustness has improved. This way of handling also solves the load-balancing problem of the prior art situation.

BRIEF DESCRIPTION OF THE DRAWINGS

The above and other objects and features of the invention will become more apparent and the invention itself will be best understood by referring to the following description of three embodiments taken in conjunction with the accompanying drawings wherein:

FIGS. 3A, 3B and 3C in their turn represent destination host DH, router R1 and edge router ER of FIG. 1 supporting the RSVP protocol and FIGS. 4A, 4B and 4C represent destination host DH, router R1 and edge router ER of FIG. 1 supporting the Internet Management Group Protocol.

DETAILED DESCRIPTION OF THE INVENTION

Figure 1:
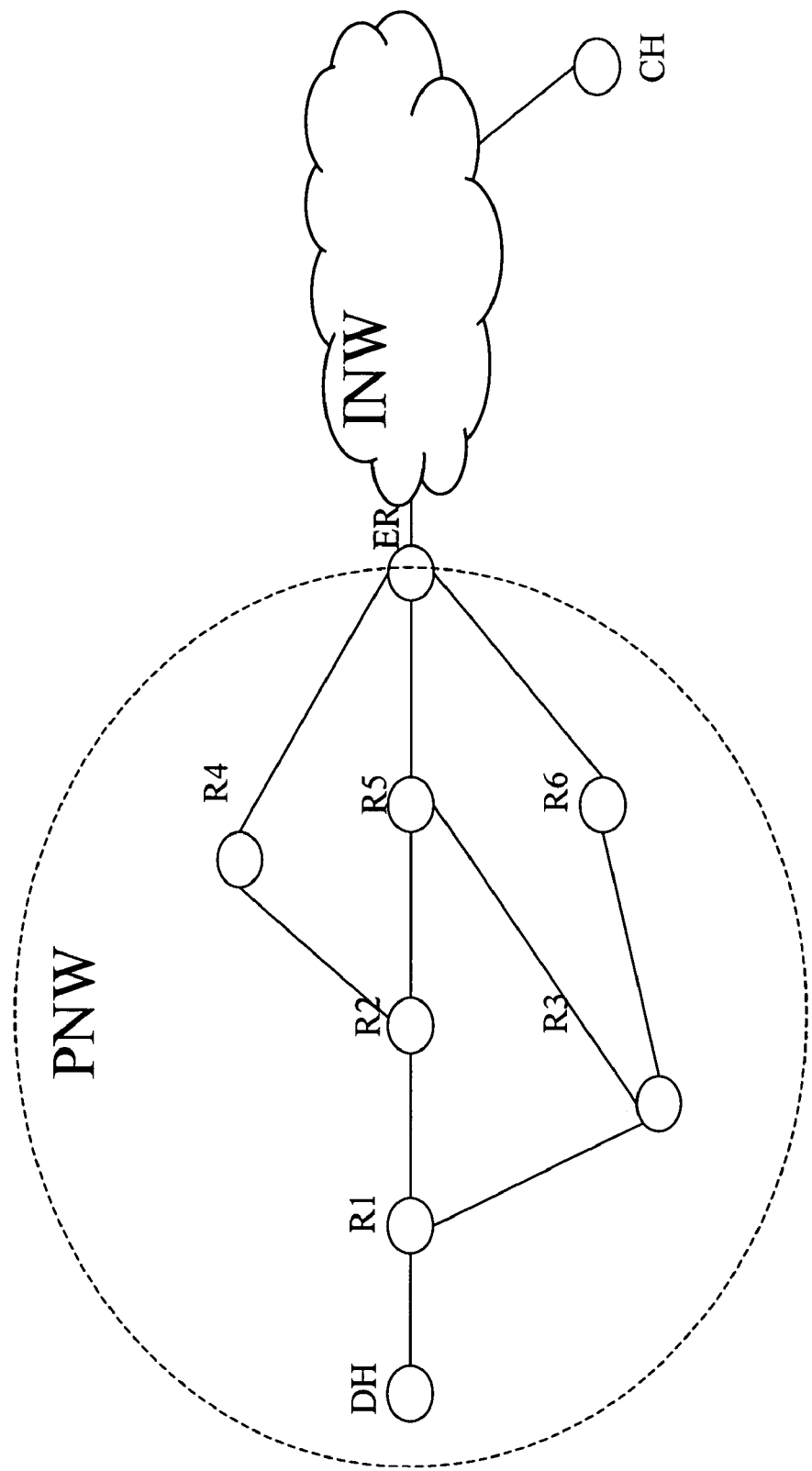
FIG. 1 represents private network coupled to the internet.

In the following paragraphs, referring to the drawings, an implementation of the method according to the present invention will be described. In the first part of this description the main elements of the network environment, as presented in FIG. 1, wherein the forwarding method of the present invention is performed, is described. This part is succeeded by a description of all interconnections between each of the before mentioned network elements. In the second part the network elements are further specified for three possible embodiments of the present invention. At first, there is for each embodiment the main means of each network element described. Secondly, all interconnections between this before mentioned means are described. Subsequently the actual execution of the forwarding method is described. Subsequently, in the following paragraphs, there are two other embodiments of this forwarding method described in the same way.

The essential elements of the network environment of the present invention are a private network and the internet. The private network PNW consists of a destination host DH, a computer terminal which is able to send and/or to receive data-packets. This destination host DH is only reachable from within the private network PNW. Then there are a number of routers R1–R6, taking care of the forwarding of privately addressed data-packets through the private network PNW. Besides these there is an edge router ER which is a router constituting the edge between the private network PNW and the internet INW. This edge router is able to receive data-packets from the private network PNW and forward them to the internet network INW, or vice versa. The internet INW comprises a contacting host CH that is also a computer terminal that is able to send and/or to receive data-packets. This is a terminal with a global Internet Protocol address, further referred to as IP address, already assigned.

Destination host DH is coupled to the first router R1 that in its turn is coupled to router R2 and router R3. Router R2 further is coupled to router R4 and Router R5. Router R3 further is coupled to router R5 and router R6, which both are coupled to edge router ER. Router R4 is also coupled to edge router ER. The edge router ER couples the private network PNW to the internet INW. At last the contacting host CH is coupled to the internet INW. All mentioned connections are supposed to be IP-links.

Figure 2:
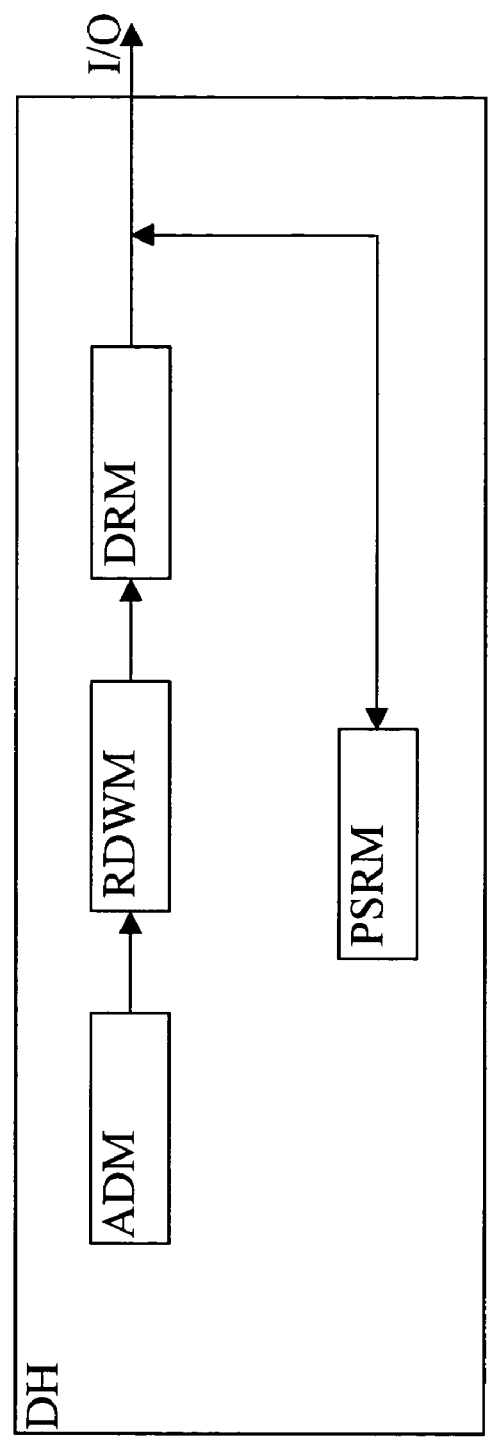
FIG. 2 represents destination host DH of FIG. 1 supporting the OSPF-protocol.

An important network element is the destination host DH which is a computer terminal having access to the private network PNW only. This destination host DH, as shown in FIG. 2 consists of an internet packet sending and reception means PSRM which is adapted to either send or receive internet packets, a routing daemon means DRM which is adapted to notify all adjacent routers of the destination host DH about the presence of this destination host DH using the Open Shortest Path First protocol flooding.

Further, the destination host DH comprises an assignment detection means ADM, which detects if the routing daemon means DRM is activated. Then there is a router daemon waking means RDWM, which takes care of activating the router daemon means DRM at assignment of the global internet address.

The assignment detection means ADM is coupled to the router daemon wake up means RDWM on its turn coupled to the daemon routing means DRM. The daemon routing means has an output-terminal that is at the same time an input/output-terminal I/O of the destination host DH. The packet sending and reception means PSRM has an input/output-terminal that is also at the same time the input/output-terminal I/O of the destination host DH.

In order to explain the operation of the present invention it is assumed that a contacting host CH connected to the internet INW tries to contact the destination host DH. It is also assumed that this contacting host CH already has gained internet connectivity. Further it is assumed that there is a mechanism within the private network PNW, which is well known by any person skilled in the art, for assigning a global IP address to the destination host DH, from a pool of global IP-addresses allocated to the private internet network PNW.

At the time the assignment detection means ADM detects that the global IP address has been assigned to the destination host, the routing daemon wake up means RDWM takes care of activating a router daemon, which was in a sleeping state at the computer terminal of the destination host DH. The routing daemon means DRM then floods an OSPF-message towards the adjacent router R1 of the destination host. Router R1 subsequently updates its routing-table and adds a new entry with the new assigned global IP address together with the link from which the OSPF message come from. Router R1 will subsequently forward the message to the adjacent routers R2 and R3 which also update their routing-tables and in its turn forward the OSPF-message in direction of the edge router ER till all routers R1–R6 of the private network PNW are updated, meaning that an entry in the routing-table has been added. If an internet data-packet destined to the destination host DH arrives at the edge router ER, the packet can be forwarded hop-by-hop, to the destination host DH using the updated routing tables of the routers on its path. The edge router ER checks on the destination-address of the packet and finds out, checking the routing table, that the packet can be sent to router R5 which in its turn, in the same way as the edge-router ER sends the packet towards router R2. Router R2 then forwards the data-packet based on the global IP address towards router R1 which forwards the packet to the destination host DH. Destination host DH checks on the IP-address of the internet packet and finds that the destination of the packet is itself.

The second embodiment making use of the Resource Reservation Protocol, further referred to as RSVP, running within the same network environment as before described and presented in FIG. 1, is described in the following paragraphs. At first, the relevant elements of destination host DH, router R1 and edge router ER from FIG. 1 as presented in FIGS. 3A, 3B and 3C are described. Subsequently the connections between the relevant elements are described and in a later paragraph the actual execution of this embodiment of the present invention is described.

The relevant elements of the destination host DH as presented in FIG. 3A are the assignment detection means ADM1 which is adapted to detect if a global IP-address has been assigned and if the destination host DH has been configured for internet connectivity, the adjacent router notification means ARNM, which is prepared to send a Resource Reservation Protocol message containing the global IP-address of destination host DH to the adjacent router R1 of the destination host DH along a shortest path in direction of the edge router ER in order to update the adjacent router's routing-table. Further there is a packet sending and reception means PSRM1, which is adapted to either send internet packets or receive internet packets.

The assignment detection means ADM1 is coupled to the adjacent router notification means ARNM having an output-terminal being at the same time an Input/output I/O1 terminal of destination host DH. The packet sending and reception means has an Input/output-terminal that is coupled to Input/output-terminal I/O1 of destination host DH.

The relevant means of the router R1, as presented in FIG. 3B, are the message reception means MRM which is adopted to receive a Resource Reservation Protocol message, a message interpretation means MIM which is adapted to interpret a received Resource Reservation Protocol message containing the global IP-address of destination host DH. Further there is a routing-table updating means RUM, which is adapted to update a routing-table with the assigned global IP-address of destination host DH and at last, router R1 comprises a message forwarding means MFM which is able to forward a Resource Reservation Protocol message containing the global IP-address of the destination host DH towards an adjacent router or edge router ER on a shortest path between the destination host DH and the edge router ER.

The message reception means MRM comprises an input-terminal which is at the same time an input-terminal I of router R1. Further the message reception means MRM is coupled to the message interpretation means MIM which in its turn is coupled to the routing-table updating means RUM. The routing-table updating means RUM is coupled to message forwarding means MFM. The message forwarding means MFM comprises an output-terminal that is also an output-terminal O of router R1.

Routers R2–R6 of FIG. 1 have in this embodiment the same structure as router R1, as described before.

Another relevant element of this embodiment is the edge router ER of FIG. 1. The relevant means of the edge router ER as presented in FIG. 3, are the message reception means MRM1 which is adapted to receive a Resource Reservation Protocol message containing the global IP-address of destination host DH, a message interpretation means MIM1 which is adapted to interpret a received Resource Reservation Protocol message that contains the global IP-address of destination host DH and a routing-table updating means RUM1, which is adapted to update a routing-table with the assigned global IP-address of destination host DH.

The message reception means MRM1 comprises an input-terminal that is at the same time an input-terminal I1 of edge router ER. Further the message reception means MRM1 is coupled to the message interpretation means MIM1 which in its turn is coupled to the routing-table updating means RUM1.

In order to explain the operation of the present invention it is again assumed that a contacting host CH connected to the internet INW tries to contact the destination host DH. It is also assumed that this contacting host CH already has gained internet connectivity. Further it is assumed that there is a mechanism within the private network PNW, which is well known by any person skilled in the art, for assigning a global IP address to the destination host DH, from a pool of global IP-addresses allocated to the private internet network PNW.

At the time the assignment detection means ADM1 detects that the global IP address has been assigned to the destination host DH, this assignment detection means ADM1 takes care of activating the adjacent router notification means ANRM. This means sends a RSVP message containing the assigned global IP-address of destination host DH to its adjacent router on the shortest path towards edge router ER, router R1. It is also assumed that the shortest path between Destination host DH and edge router ER for the in this embodiment described network configuration leads via Routers R1, R2 and R5. The message reception means MRM of Router R1 receives the RSVP-message together with the assigned global IP-address which was incorporated in the RSVP message. The message interpretation means MIM of router R1 interprets the global IP-address by linking the global IP-address of the destination host DH with the interface of router R1 where the message came from and the routing-table updating means RUM of Router R1 subsequently updates its routing-table by adding a new entry containing the global IP-address and the interface of router R1 where the RSVP message came from. Message forwarding means MFM of Router R1 then forwards an RSVP-message requesting router R2 in the same way as before described, to update its routing-table with a new entry containing the global IP-address of the destination host and the interface of router R2 where the message came from. Router R2 in its turn forwards the RSVP-message towards router R5 which will handle the message in the same way as before described, and which will forward the RSVP-message towards the edge router ER. The routing tables of both previously mentioned routers R2 and R5 will be updated in the same way as described before. The message reception means MRM1 of edge router ER receives the RSVP-message together with the assigned global IP-address which was incorporated in the RSVP message. The message interpretation means MIM1 of edge router ER interprets the global IP-address address by linking the global IP-address of the destination host DH with the interface of router R1 where the message came from and the routing-table updating means RUM1 of edge router ER then updates its routing-table by adding a new entry containing the global IP-address and the interface of edge router ER where the RSVP message came from.

In this way a data-packet from contacting host CH, arriving at the edge router ER and having destination host DH as destination, this data-packet containing consequently the global IP-address of destination host DH will be routed along the path of routers R5, R2 and R1 towards destination host DH using global IP-address and based on information as kept in the routing tables of the respective routers.

It is also to be remarked that there is another way of implementing this solution. The destination host DH will send a request to establish a path towards the edge router ER. The edge router in its turn will receive the request, update the routing-table with a new entry containing the global IP-address together with the interface the message is coming from and subsequently send a path establishment request in the direction of the destination host DH along all routers situated on the shortest path. The message reception means MRM of each router R1–R6 receives the path establishment request message together with the assigned global IP-address which was incorporated in the RSVP message. The message interpretation means MIM of each router R1–R6 interprets the global IP-address address by linking the global IP-address of the destination host DH with the interface where the message is going to and the routing-table updating means RUM then updates its routing-table by adding a new entry containing the global IP-address and the interface of the router where the message is going to.

There is a third embodiment that makes use of a multicasting protocol Internet Group Management Protocol, further referred to as IGMP, running within the same network environment as before described and presented in FIG. 1, is described in the following paragraphs. At first, the relevant elements of destination host DH, router R1 and the edge router ER from FIG. 1 as presented in FIGS. 4A, 4B and 4C are described. Subsequently the connections between the relevant elements are described and in a later paragraph the actual execution of this embodiment of the present invention is described.

The relevant means of the destination host DH as presented in FIG. 4A are the assignment detection means ADM3 which is adapted to detect if a global IP-address has been assigned and if the destination host DH has been configured for internet connectivity, the multicast subscription means MCSM adapted to notify an adjacent router R1–R6 of the private internet network PNW on the shortest path towards the edge router ER about the presence of a subscribing destination host DH using the IGMP multicast protocol and the global IP-address of destination host DH. Further there is a packet sending and reception means PSRM2, which is adapted to either send internet packets or receive internet packets.

The assignment detection means ADM3 is coupled to the multicasting subscription means MCSM having an output-terminal being at the same time an Input/output terminal I/O2 of destination host DH. The packet sending and reception means PSRM2 has an Input/output-terminal that is coupled to Input/output-terminal I/O2 of destination host DH.

The relevant means of router R1 in this embodiment as presented in FIG. 4B are the message reception means MRM2, which is adapted to receive a multicast message containing the global IP address of the destination host DH, a multicast group updating means MGUM which is adapted to interpret the multicast message containing the global IP address of the destination host DH and to update a multicast group in order to establish a link of the branch of a multicast tree. At last there is a message forwarding means MFM2 which is able to forward a multicast message containing the global IP-address of said destination host DH towards an adjacent router or edge router ER on the shortest path between destination host DH and edge router ER.

Router R1 comprises an input-terminal I2 that is also an input-terminal of message reception means MRM2. Message reception means MRM2 is coupled to the multicast group updating means MGUM that in its turn is coupled to message forwarding means MFM2. Message forwarding means MFM2 comprises an output-terminal that is also an output-terminal O1 of router R1. Routers R2–R6 of FIG. 1 have in this embodiment the same structure as router R1, as described before.

The third relevant element of this embodiment is the edge router ER as presented in FIG. 4C which includes the following means: a message reception means MRM3 which is able to receive a multicast message containing the global IP-address of destination host DH and a multicast group updating means MGUM1, which is adapted to interpret the multicast message containing the global IP-address of destination host DH and to update a multicast group based on said global IP-address in order to establish a link of the branch of a multicast tree.

Edge router ER comprises an input-terminal I3 that is also an input-terminal of message reception means MRM2. Message reception means MRM2 is coupled to the multicast group updating means MGUM1.

In order to explain the operation of the present invention it is again assumed that a contacting host connected to the internet INW tries to contact the destination host. It is also assumed that this contacting host already has gained internet connectivity. Further it is assumed that there is a mechanism within the private network PNW, which is well known by any person skilled in the art, for assigning a global IP address to the destination host DH, from a pool of global IP-addresses allocated to the private internet network PNW.

At the time the assignment detection means ADM3 detects that the global IP address has been assigned to the destination host DH the multicasting subscription means MCSM sends an IGMP join-message with the assigned global IP-address incorporated in the join-message towards adjacent router R1, that is at the same time the designated router, in order to indicate that the destination host wants to subscribe to the multicast tree whereof the edge router ER is the administration or the root of the tree. Besides it is determined using Protocol Independent Multicast that the shortest path between destination host DH and edge router ER for the in this embodiment described network configuration leads via routers R1, R2 and R5.

The message reception means MRM2 of the designated router, router R1 receives the IGMP join message together with the assigned global IP-address which is incorporated in the join message. Subsequently the multicasting group updating means MGUM will interpret the message and update the multicasting group by adding the IP-link where the join-message came from to the multicast group together with the assigned global IP-address as the multicast address. Then message forwarding means MFM2 forwards the join-message containing the global IP-address of destination host DH towards the router R2. Router R2 handles the join-message in the same way as router R1 and in the end forwards the join message to router R5 that, again, will handle the join message in the same way as router R1. This results in an updated multicast group information. The join message at last is forwarded to edge router ER. The message reception means MRM3 receives the IGMP-join-message together with the assigned global IP-address. Subsequently the multicasting group updating means MGUM1 will interpret the message and update the multicasting group by adding the IP-link where the join-message came from to the multicast group with the assigned global IP-address of destination host DH as the multicast-address.

In this way a data-packet from contacting host CH, arriving at the edge router ER and having destination host DH as destination, this data-packet containing consequently the global IP-address of destination host DH will be selected by the edge router ER as a multicast packet based on the assigned global IP-address of destination host DH and subsequently treated as a multicast packet by consulting the multicast group information, as kept in the corresponding tables of the respective routers, in order to routed the internet packets along the path of routers R5, R2 and R1 towards destination host DH.

Although the above embodiment of the invention has been described by means of functional blocks, their detailed realisation based on this functional description should be obvious for a person skilled in the art and is therefore not described.

While the principles of the invention have been described above in connection with specific apparatus, it is to be clearly understood that this description is made only by way of example and not as a limitation on the scope of the invention, as defined in the appended claims.

What is claimed is:

1. An Internet forwarding method, for forwarding internet packets from a host connected to an internet towards a destination host connected to a privately addressable internet network, where said internet network and said privately addressable internet network are coupled through at least one edge router, and where said destination host is assigned a global Internet address, including forwarding of said internet packets from one of said at least one edge router towards said destination host, wherein the only address used for forwarding is said global internet address.

2. The Internet forwarding method according to claim 1, wherein said forwarding from one of said at least one edge router comprises:
   a. activating a router daemon at said destination host by assigning said global internet address;
   b. notifying each router of said privately addressable internet network about a presence of said destination-host by said router-daemon using Open Shortest Path First protocol flooding;
   c. updating a routing-table for each of said routers; and
   d. forwarding said internet packets based on said routing tables of said routers in said internet network towards said destination host.

3. The Internet forwarding method according to claim 1, wherein said forwarding from one of said at least one edge router comprises:
   a. notifying each router of said privately addressable internet network situated on a shortest path between said destination host and said one of said at least one edge router and said one of said at least one edge router by sending a Resource Reservation Protocol set-up message at assignment of a global Internet address;
   b. updating a routing-table of said each router in said internet network on said shortest path towards said one of said at least one edge router and notifying said one of said at least one edge router; and
   c. forwarding said internet packets from said one of said at least one edge router towards said destination host along said shortest path.

4. The Internet forwarding method according to claim 1, wherein said forwarding from one of said at least one edge router comprises:
   a. activating said destination host by assigning said global internet address;
   b. sending a multicast join message by said destination host towards said edge-router in order to join a multicast-group set-up by said edge router;
   c. constructing a branch of a multicast tree between said destination host and said edge router; and
   d. forwarding said internet packets from said edge router towards said destination host along said branch of said multicast tree.

5. An Internet forwarding system, for forwarding internet packets from a host connected to an internet towards a destination host connected to a privately addressable internet network, where said internet network and said privately addressable internet network are coupled through at least one edge router, and where said destination host is assigned a global Internet address, said internet forwarding system comprising a forwarding means, adapted to route said internet packets from one of said at least one edge router towards said destination host, where the only address used for forwarding is said global internet address.

6. The Internet forwarding system according to claim 5, wherein said forwarding means comprises:
   a. router daemon waking means, adapted to activate a router daemon at said destination host by assigning said global internet address;
   b. notification means, adapted to notify each router of said privately addressable internet network about the presence of said destination-host by said router-daemon using Open Shortest Path First protocol flooding;
   c. updating means, adapted to update a routing-table for each of said routers; and
   d. forwarding means, adapted to forward said internet packets based on routing tables of said routers in said internet network towards said destination host.

7. The Internet forwarding system according to claim 5, wherein said forwarding means comprises:
   a. notification means, adapted to notifying each router of said privately addressable network situated on a shortest path between said destination host DH and said one of said at least one edge router and said one of said at least one edge router by sending a Resource Reservation Protocol set-up message at assignment of a global Internet address;
   b. routing-table updating means, adapted to update routing tables of said each router in said internet network on said shortest path towards said edge router; and
   c. forwarding means, adapted to forward said internet packets from said edge router towards said destination host.

8. The Internet forwarding system according to claim 5, wherein said forwarding means comprises:
   a. assignment detection means, adapted to activate said destination host by assigning said global internet address;
   b. path establishment requesting means, adapted to send a multicast join message by said destination host towards said edge-router in order to join a multicast-group set-up by said edge router;
   c. path constructing means, adapted to build up a multicast tree between said destination host and said edge router; and
   d. forwarding means, adapted to forward said internet packets from said edge router towards said destination host along said multicast tree.

9. A destination host for use in a private internet network internet packets being forwarded from said destination host towards a host connected an internet network or vice versa, said private internet network comprising at least one router and at least one said destination host, each coupled to one of said at least one router, said private internet network being coupled to said internet network through at least one edge router and where said destination host is assigned a global internet address, said destination host comprising:
   a. internet packet sending and reception means, adapted to either send or receive said internet packets, wherein said destination host further comprises the following means:
   b. routing daemon means, adapted to notify each adjacent router, from said at least one router, of said destination host about the presence of said destination host using a Open Shortest Path First protocol flooding and said global internet address;
   c. an assignment detection means, adapted to detect if said destination host has been configured for internet connectivity and said global internet address has been assigned; and d. router daemon waking means, adapted to activate said router daemon means at assignment of said global internet address.

10. A destination host for use in a private internet network, internet packets being forwarded from said destination host towards a host connected to an internet network or vice versa, said private internet network composing at least one router and at least one said destination host, each coupled to one of said at least one router, said private internet network being coupled to said internet network through at least one edge router and wherein said destination host is assigned a global internet address, said destination host comprising:
   a. internet packet sending and reception means, adapted to either send internet packets or receive said internet packets, wherein said destination host further comprises the following means;
   b. assignment detection means, adapted to detect if said destination host has been configured for internet connectivity and a global internet address has been assigned; and
   c. adjacent router notification means, coupled with an input to an output of said assignment detection means and adapted to send a Resource Reservation Protocol message containing said global internet address to an adjacent router of said destination host along a shortest path in direction of said edge router in order to update a routing-table of said adjacent router.

11. A router for use in a private internet network, internet packets being forwarded from a destination host of said private internet network towards a host connected to an internet network or vice versa, said private internet network comprising at least one said router and at least one said destination host, each coupled to one of at least one said router, said private internet network being coupled to said internet network through at least one edge router, said router comprising:
   a. message reception means adapted to receive a Resource Reservation Protocol message, wherein said router further comprises the following means:
   b. message interpretation means, coupled with an input to an output of said message reception means and adapted to interpret said Resource Reservation Protocol message containing a global internet address of said destination host;
   c. routing-table updating means, coupled with an input to an output of said message interpretation means and adapted to update a routing-table with said global internet address of said destination host; and
   d. message forwarding means, coupled with an input to an output of said routing-table updating means and adapted to forward said Resource Reservation Protocol message containing said global internet address of said destination host towards an adjacent router or edge router on a shortest path between said destination host and said edge router.

12. An edge router for use in a private internet network, internet packets being forwarded from a destination host of said private internet network towards a host connected to an internet network or vice versa, said private internet network comprising at least one said router and at least one said destination host, each coupled to one of said at least one said router, said private internet network being coupled to said internet network through at least one said edge router, said edge router comprising:
   a. message reception means adopted to receive a Resource Reservation Protocol message, wherein said edge router further comprises the following means:
   b. message interpretation means, coupled with an input to an output of said message reception means and adapted to interpret said Resource Reservation Protocol message containing a global internet address of said destination host; and
   c. routing-table updating means, coupled with an input to an output of said message interpretation means and adapted to update a routing-table with said global internet address of said destination host.

13. A destination host for use in a private internet network, internet packets being forwarded from said destination host towards a host connected to an internet network or vice versa, said private internet network comprising at least one router and at least one said destination host, each coupled to one of said at least one router and where said destination host is assigned a global internet address, said private internet network being coupled to said internet network through at least one edge router, said destination host comprising:
   a. internet packet sending and reception means, adapted to either send internet packets or receive said internet packets wherein said destination host further comprises the following means:
   b. assignment detection means, adapted to detect if said destination host gets internet connectivity and a global internet address is assigned; and
   c. multicast subscription means, coupled with an input to an output of said assignment detection means and adapted to notify an adjacent router of said private internet network on a shortest path towards said edge router about the presence of a subscribing destination host using a multicast protocol and said global internet address.

14. A router for use in a private internet network, internet packets being forwarded from a destination host of said private internet network towards a host connected to an internet network or vice versa, said private internet network comprising at least one said router and at least one said destination host, each coupled to one of said at least one router and wherein said destination host is assigned a global internet address, said private internet network being coupled to said internet network through at least one edge router, wherein said router comprises:
   a. message reception means, adapted to receive a multicast message containing said global internet address;
   b. multicast group updating means, coupled with an input to an output of said message reception means and adapted to interpret said multicast message containing said global internet address of said destination host and update a multicast group in order to establish a branch of a multicast tree; and
   c. message forwarding means, coupled with an input to an output of said multicast group updating means and adapted to forward a multicast message containing said global internet address of said destination host towards an adjacent router or edge router on a shortest path between said destination host and said edge router.

15. An Edge Router, for use in a private internet network, internet packets being forwarded from a destination host of said private internet network towards a host connected to an internet network or vice versa, said private internet network comprising at least one router and at least one said destination host, each coupled to one of said at least one router and wherein said destination host is assigned a global internet address, said private internet network being coupled to said internet network through at least one said edge router, said edge router comprising:

a. message reception means, adapted to receive a multicast message containing said global internet address; and
b. multicast group updating means, coupled with an input to an output of said message reception means and adapted to interpret said multicast message containing said global internet address of said destination host and update a multicast group based on said global internet address in order to establish a branch of a multicast tree.

16. The Internet forwarding method according to claim 1, wherein the destination host is only reachable from within the privately addressable network.

17. The Internet forwarding method according to claim 1, wherein the privately addressable network comprises elements that are only privately addressable.

18. The Internet forwarding method according to claim 17, wherein said internet packets are forwarded from the at least one edge router to the destination host via said elements only based on said global internet address.

19. The Internet forwarding system according to claim 5, wherein the privately addressable network comprises elements that are only privately addressable.

20. The Internet forwarding system according to claim 19, wherein said internet packets are forwarded from the at least one edge router to the destination host via said elements only based on said global internet address of the destination host and wherein the destination host is a terminal within the privately addressable network.

* * * * *